Nov. 17, 1959 T. D. COOPER 2,913,663
SYSTEM AND METHOD FOR MEASURING THE DEVIATION
FACTOR OF WAVE FORMS
Filed May 23, 1956 2 Sheets-Sheet 1

INVENTOR.
Theodore D. Cooper

BY

ATTORNEYS

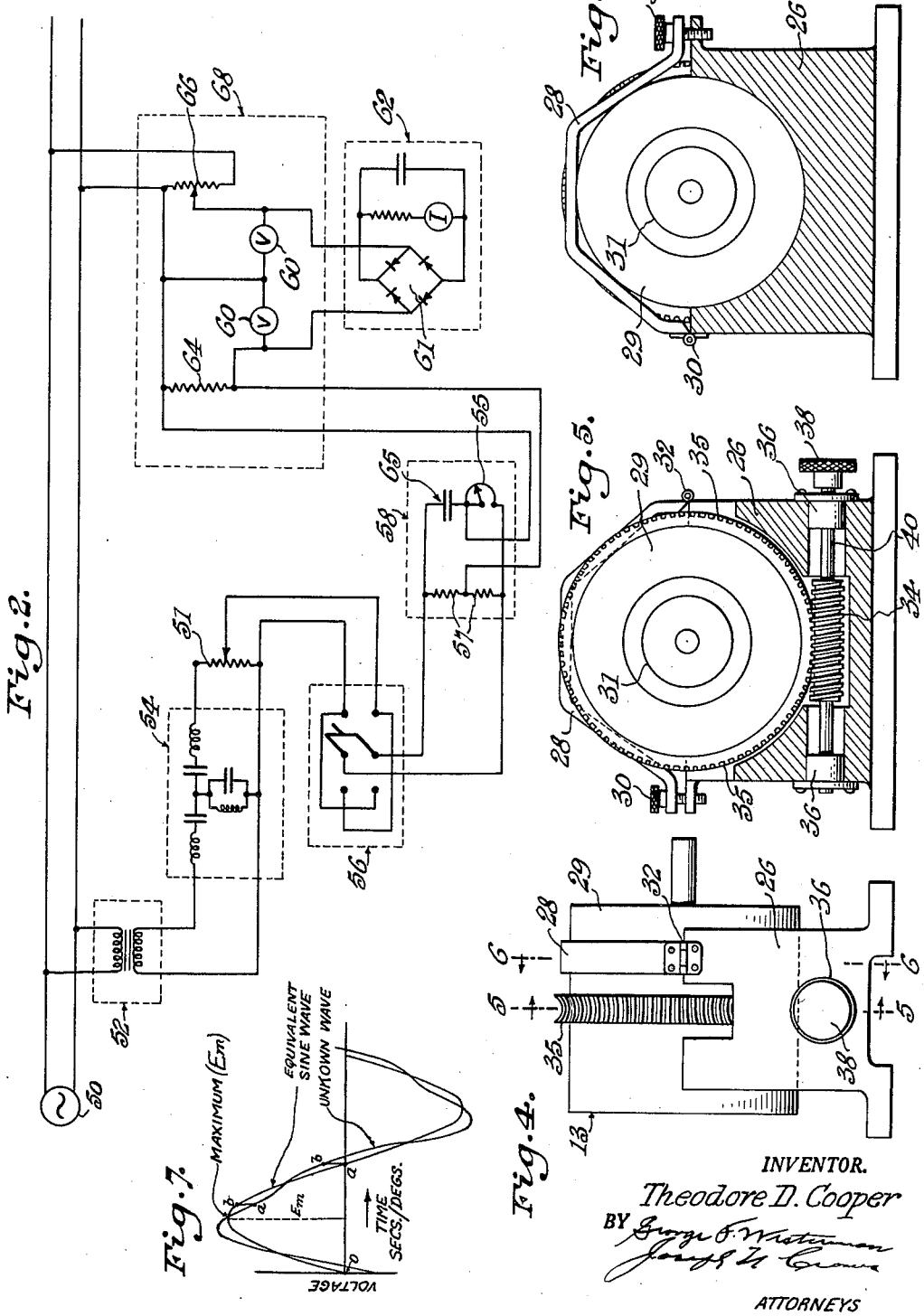

United States Patent Office 2,913,663
Patented Nov. 17, 1959

2,913,663

SYSTEM AND METHOD FOR MEASURING THE DEVIATION FACTOR OF WAVE FORMS

Theodore D. Cooper, Arlington, Va., assignor to the United States of America as represented by the Secretary of the Army Application May 23, 1956, Serial No. 586,887

17 Claims. (Cl. 324—77)

(Granted under Title 35, U.S. Code (1952), sec. 266)

The invention described herein may be manufactured and used by or for the Government for governmental purposes without the payment of any royalty thereon.

This invention relates to systems for determining the deviation factor of a periodic wave form.

An important object of the invention is to provide means for instantaneously determining the deviation factor of an unknown periodic wave form from a direct reading instrument.

A further object of this invention is to employ a visible indicator to show when two equal sine wave forms are properly superimposed.

These and other objects, advantages, and novel features of the invention will be apparent from the following specification, when taken in conjunction with the accompanying drawings, and the features of novelty will be pointed out in particularity in the appended claims.

In the accompanying drawings—

Figs. 2 and 3 are diagrammatic illustrations of modified forms of the invention;

Fig. 4 is a side elevation of the sine wave generator having a stator mounted in a yoke which will permit this stator to be rotated manually about its longitudinal axis, and clamped in any position with respect to the alternator stator;

Fig. 5 is a sectional view taken on the line 5—5 of Fig. 4 looking in the direction of the arrows;

Fig. 6 is a sectional view taken on the line 6—6 of Fig. 4 looking in the direction of the arrows; and Fig. 7 is a graphical representation of an unknown periodic wave superimposed in substantially proper phase relationship with the equivalent sine wave form.

Figure 3:
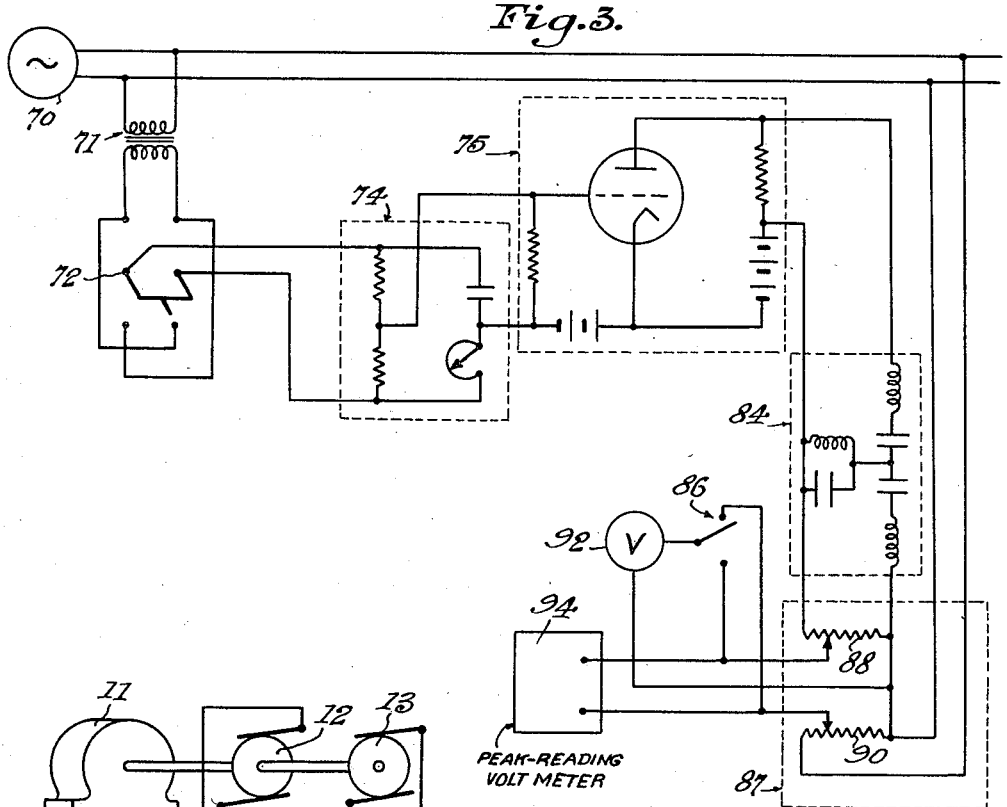

The deviation factor of a wave may be defined to be the ratio of the maximum difference between corresponding ordinates of the wave and of the equivalent sine wave to the maximum ordinate of the equivalent sine wave when the waves are superimposed in such a way as to make this maximum difference as small as possible.

The deviation factor is particularly important to insure that a wave form be of proper shape and that the deviation from a sinusoidal wave form shall be a minimum in order that the alternating current device operate efficiently. For example, a deviation factor of substantially ten percent is usually allowable for commercial alternators or five percent for military alternators.

In order to obtain the deviation factor of a given periodic wave, it is necessary to accomplish the following:

Establish the value of the "equivalent sine wave," i.e. a pure sine wave having the same R.M.S. value as the unknown wave.

Compare the unknown and the equivalent sine waves by superimposing one on the other, shifting the phase relation of one wave with respect to the other until the maximum difference between corresponding ordinates becomes a minimum.

Measure this minimum value of the maximum difference between corresponding ordinates.

Divide this minimum value by the peak value of the equivalent sine wave to obtain the deviation factor of the unknown wave. The quotient is usually multiplied by 100 to express the deviation factor in percent.

Conventional methods for measuring deviation factor involve a graphical comparison of the unknown wave and its equivalent sine wave. The procedure is as follows:

The unknown wave is recorded photographically (usually by a magnetic oscillograph), and its R.M.S. value is noted.

The equivalent sine wave is established from a mathematical analysis of this recording, or by making a separate recording of a true sine wave having the same R.M.S. value as the unknown wave. The equivalent sine wave is plotted or recorded to the same time and amplitude scales as were employed in the recording for the unknown wave.

The unknown and the equivalent sine waves are superimposed one on the other in a manner such that the axes of zero amplitudes for both waves coincide. Maintaining this coincidence of axes, the two waves are shifted with respect to each other until the maximum difference between corresponding ordinates is a minimum.

The deviation factor is computed from this minimum measurement as a fraction of the peak value of the equivalent sine wave.

The conventional method is expensive, time consuming, and involves many sources of error, among which are: (1) distortions introduced during the photographic and film developing processes; (2) width of the wave traces (on the recordings) is often comparable to the difference between the two waves, making accurate measurement of this difference difficult; (3) neither method of determining and recording the equivalent sine wave is entirely satisfactory; one involves replotting of curves and precise measurements of areas bounded by irregular curves; the other requires exact matching of the amplitude and time scales of one recording to those of another.

This invention discloses a method and combination of apparatus for obtaining the deviation factor of periodic wave forms directly from a reading from a simple indicating instrument, without the necessity for recording waves, plotting curves, graphical comparison of curves, graphical shifting of curves, making physical distance measurements, or making involved computations. The various measures listed in the steps described above are all carried out electrically by a quick, accurate, and simple procedure of adjusting the circuit for proper superimposing of the two wave forms and then reading an indicating instrument for directly obtaining the deviation factor on a percentage basis in each embodiment of the invention.

In the practice of the instant invention, the unknown and the equivalent sine waves are superimposed one on the other in such a manner that the axes of zero amplitude coincide. Maintaining this coincidence of axes, the two waves are shifted by phase shift means with respect to each other until the maximum difference between corresponding ordinates is a minimum, as shown by a direct indicating device. The invention is intended primarily for use at frequencies ordinarily from 25 to 400 cycles per second. However, if the components of this system are chosen of proper values. The principles involved in this invention are applicable to radio and other higher frequency work, and this invention is not restricted to power frequencies but is applicable to all frequencies.

Figure 1:
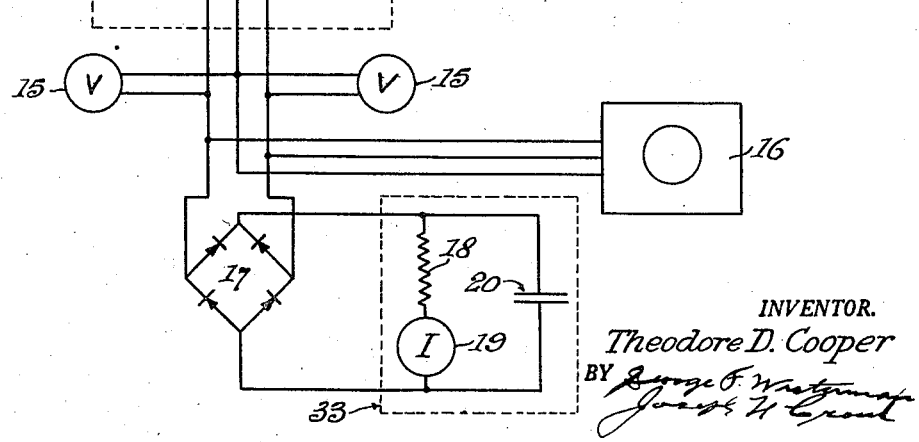
Fig. 1 is a diagrammatic illustration of a system embodying the invention.

Referring to Fig. 1, reference numeral 11 is a suitable prime mover driving alternator 12 and sine wave generator 13 of identical frequency with 12. The stator 29 of sine wave generator 13 is mounted in a yoke 26 as shown in Figs. 4, 5, and 6, which will permit the stator to be rotated manually about its longitudinal axis, and clamped in any position with respect to the alternator stator which is held in a fixed position. Reference numeral 14 is a comparison network consisting of two potentiometers 22 and 24; members 15 are root-mean-square reading alternating current voltmeters; member 16 is a dual beam or trace electronic oscilloscope; member 17 is a full-wave bridge type rectifier network utilizing crystal type rectifiers; member 18 is a resistor; member 19 is a sensitive direct current d'Arsonval type indicating instrument; and 20 is a condenser. The output from the alternator 12 (unknown wave) is fed into one potentiometer 22 of the comparing network 14, and the output of the sine wave generator 13 is fed into the other potentiometer 24. The potentiometers 22 and 24 are then adjusted until the R.M.S. voltmeters 15 indicate exactly the same value. The output wave of one potentiometer will then bear an equivalent sine wave relation to the output of the other. The two potentiometers 22 and 24 are so connected that the instantaneous difference in their output voltages is applied to the rectifier 17. Thus, the comparing circuit 14 also performs the function of electrically superimposing one wave form on the other. The rectifier 17 feeds into a peak-reading voltmeter shown as a circuit network by block enclosure 33 comprising resistor 18, meter 19, and condenser 20. That is, with the proper selection of components, the reading of meter 19 will be proportional to the highest instantaneous value of the voltage difference between the two potentiometer outputs from members 22 and 24, without regard to the polarity of this voltage difference. This quality enables the device to perform the function of measuring "the maximum difference between corresponding ordinates of the unknown or measured wave and the equivalent sine wave."

If the sine wave generator yoke clamp 28 is loosened and its stator 29 is rotated by turning member 38, the effect will be that of shifting the phase of one potentiometer output wave with respect to the other. This will cause the maximum instantaneous difference in voltage to change, which will be reflected as a change in reading of the meter 19. Stator 29 is rotated until the reading of meter 19 is a minimum. Thus, by mechanically rotating the stator 29, said stator will perform the function of insuring that the superposition of the two waves is "in such a way as to make this difference as small as possible" as stated in the definition of deviation factor.

The deviation factor can now be calculated as being $$\frac{IR}{\sqrt{2}V}$$

in which R is the value of the resistor 18 in ohms plus the resistance of the meter 19, I is the minimum reading of meter 19 in amperes, and V is the reading of voltmeter 15. If V is so adjusted that $\sqrt{2}V$ is equal to 100, and if the scale of the meter 19 is calibrated to show the product IR, the deviation factor can then be read directly in percent from the meter 19, without any computations. Since the potentiometers 22 and 24 introduce no distortion, the value read will be the deviation factor of the alternator 12 under test.

The oscilloscope 16 is not essential in making the measurement described above; it merely serves as an indicator to show the approximate phase position of one wave with respect to the other wave for any given position of the stator 29 of sine wave generator 13.

Referring to Figs. 4, 5, and 6, there is provided a suitable sine wave generator 13 with rotor 31, adjustable yoke clamp 28, stator 29, yoke base 26, adjustment for yoke clamp 30, rotor 31, yoke clamp hinge 32, worm gear 34, stator ring gear 35, worm gear bearings 36, and adjusting knob 38 on end of worm gear shaft 40 for rotating stator 29.

Fig. 2 is a circuit diagram of another embodiment of this invention in which the device 50 under test may also serve as a sine wave source. The output voltage of 50 is applied directly to the comparison circuit 68 and also indirectly through an isolating transformer 52, a filter circuit 54, a potentiometer 51, a reversing switch 56, and phase shifting network 58.

The filter network designated by block enclosure 54 utilizes one or more pi sections, each pi section consisting of two resonant and one anti-resonant circuits. Both the resonant and the anti-resonant circuits are tuned for fundamental frequency of the A.C. voltage source, constituting a band-pass type of filter to attenuate all frequencies except (the desired fundamental frequency) in a specified band for the purpose of eliminating harmonics of a value large enough to introduce significant error in the measurement.

The comparison circuit 68 comprises two potentiometers 64 and 66, two R.M.S. voltmeters 60, and is similar to network 33 of Fig. 1. The components included in enclosure 62 comprise a peak reading voltmeter similar to that formed by 17 and 33 of Fig. 1.

The reversing switch of Fig. 2 designated by block enclosure 56 is used to reverse the input into the phase-shift device 58 for reasons which will be explained later. The phase-shift device or bridge network designated block enclosure 58, is of a bridge type of network comprising a capacitor 65, a rheostat 55, and two resistors 57 of the same ohmic value. In use, when the rheostat 55 is set for zero ohms the bridge output is in phase with the bridge input. As the resistance of the rheostat 55 is increased above zero, the output voltage begins to lead the input voltage, giving the effect of a phase shift (lead) of the bridge network 58 output voltage with respect to the A.C. voltage source 50 for a given position of 56. In making a deviation factor measurement, it is necessary to shift the equivalent sine wave in the lag direction as well as in the lead direction with respect to the voltage from source 50. This is accomplished by utilizing the reversing switch to reverse the A.C. voltage input into the phase-shift device 58. Thus, while the output of device 58 will still lead its input voltage, it will now be a lagging output with respect to source 50 and will remain substantially constant at a value equal to half the bridge 58 input voltage if rheostat 55 is adjusted to have a high impedance compared to that of capacitor 65.

Fig. 3 is another embodiment of this invention differing from Fig. 2 by arrangement and addition of certain components, in which a thermionic amplifier means designated by block enclosure 75 is introduced in the circuit after the phase-shift device 74, and in which (band-pass) filter network 84 is connected to the output of amplifier means 75 and the output of the filter network 84 is connected across potentiometer 88 of comparing circuit 87. The output of comparing circuit means 87 is connected to peak-reading voltmeter 94 and R.M.S. reading voltmeter 92. Voltmeter 92 may be selectively connected by reversing switch 86 across either potentiometer 88 or potentiometer 90 of the comparing circuit means 87.

In this embodiment of the invention, the output voltage of the alternator 70 or other device may be directly compared with an equivalent sine wave obtained from the amplifier output. This arrangement is advantageous in that it permits a very high ohmic loading of the phase-shift network 74, allowing use of smaller network components and avoiding overloading of the network which could cause undesirable variation of output with phase shift.

Fig. 7 shows the superimposing of the unknown wave form on the equivalent sine wave as seen by dual traces on an oscilloscope. The deviation factor of the unknown wave may be algebraically expressed as follows:

$$D.F. = \frac{b-a}{E_m}$$

when these two wave forms are shifted along a common axis in such a manner that the maximum difference between corresponding ordinates (a) and (b) of the two respective wave forms is as small as possible. The maximum difference in corresponding ordinates is (b—a), while the maximum value of the equivalent sine wave may be expressed as shown in vertical ordinate value as $E_m$.

Having thus described my invention, what I claim as new and wish to secure by Letters Patent is:

1. An apparatus for determining the deviation factor of a periodic unknown wave form comprising a comparing network having dual electrically paralled paths of equal impedance value, generating means electrically connected to said comparing network for simultaneously applying an alternating voltage having a periodic unknown wave form to one of said dual paths of said network and a pure sine wave voltage to the other of said dual paths of said network, means for driving said generating means, phase shifting means electrically connected to one of said dual paths of said comparing network and said generating means for shifting the phase of said pure sine wave voltage relative to said alternating voltage of periodic unknown wave form, said comparing network yielding a differential output between the simultaneously applied synchronous alternating and pure sine wave voltages across the said dual paths of said comparing network, recording means electrically connected to the output of said comparing network and actuated in response to said differential output whereby the deviation factor of said alternating voltage of periodic unknown wave form may be determined.

2. Apparatus as recited in claim 1 wherein said recording means includes a rectifying bridge electrically connected to the output of said comparing network and a peak reading voltmeter electrically connected to said rectifying bridge.

3. Apparatus as recited in claim 1 wherein said recording means includes a dual trace cathode ray oscilloscope.

4. Apparatus for determining the deviation factor of a periodic unknown wave form comprising a comparing network having electrically paralleled dual paths of equal impedance value, generating means for producing an alternating voltage having a periodic unknown wave form and a pure sine wave voltage, said generating means being electrically connected to said comparing network for simultaneously applying said periodic unknown wave form voltage directly to one of said dual paths of said comparing network and indirectly electrically connected for applying the pure sine wave voltage to the other of said dual electrical paths of said comparing network, said indirect electrical connection including interconnected electrical filter means and phase shifting means electromagnetically connected to said generating means, means for driving said generating means, said comparing network yielding a differential output between the simultaneously synchronous alternating and pure sine wave voltages applied across the said dual paths of said comparing network, electrical recording means electrically connected to the output of said comparing network and actuated in response to said differential output whereby the deviation factor of said alternating voltage of periodic unknown wave form may be determined.

5. Apparatus for determining the deviation factor of an unknown periodic wave form comprising a comparing network having electrically paralleled dual paths of equal impedance value, a first generator for producing an alternating voltage having a periodic unknown wave form, said first generating means being directly electrically connected to one of said dual paths of said comparing network, a second generator for producing a sine wave voltage directly electrically connected to the other one of said dual paths of said comparing network, said first and second generators being mechanically directly interconnected and driven by a prime mover, the structure of said second generator including a mechanical phase shifter for shifting the phase of the sine wave voltage produced thereby electrically relative to said alternating voltage of periodic unknown wave form, voltage recording means electrically connected in each of said dual paths, said comparing network yielding a differential output between the simultaneously applied synchronous alternating and sine wave voltages applied across the said dual paths of said comparing network, recording means electrically connected to the output of said comparing network and actuated in response to said differential output voltage whereby the deviation factor of said alternating voltage of periodic unknown wave form may be determined.

6. Apparatus as recited in claim 5 wherein each of said dual paths of said comparing network include a potentiometer.

7. Apparatus for determining the deviation factor of a periodic unknown wave form comprising a comparing network having electrically paralleled dual paths of equal impedance value, generating means for producing an alternating voltage having a periodic unknown wave form and a pure sine wave voltage, said generating means being electrically connected to said comparing network for simultaneously applying said periodic unknown wave form voltage directly across a potentiometer in one of said dual paths of said comparing network and indirectly electrically connected for applying the pure sine wave voltage across a potentiometer in the other of said dual paths of said comparing network, said indirect electrical connection including interconnected electrical filter means and phase shifting means, said phase shifting means being electrically connected between said comparing network and said filter means, said filter means being electrically connected between said generating means and said phase shifting means, electromagnetic means coupling said filter means to said generating means, means driving said generating means, voltage recording means electrically connected in each of said dual paths of said comparing network, said comparing network yielding a differential output between the simultaneously applied synchronous alternating and pure sine wave voltages connected across the dual paths of said comparing network, recording means electrically connected to the output of said comparing network and actuated in response to said differential output voltage whereby the deviation factor of said alternating voltage of periodic unknown wave form may be determined.

8. Apparatus as recited in claim 7 wherein said phase shifting means includes an electrical impedance network and a mechanical switching member, said electrical impedance network having resistive and capacitative components and a portion of said resistive component being variable.

9. Apparatus as recited in claim 7 wherein said filter means includes a resistance load across the output thereof for adjusting the magnitude of said sine wave voltage applied to said phase shifting means.

10. Apparatus for determining the deviation factor of a periodic unknown wave form comprising a comparing network having electrically paralleled dual paths of equal impedance value, generating means for producing an alternating voltage having a periodic unknown wave form and a phase sine wave voltage, said generating means being electrically connected to said comparing network for applying said periodic unknown wave form voltage directly across one of said dual impedance paths of said comparing network and indirectly electrically connected for applying the pure sine wave voltage across the other of said dual paths of said comparing network, said indirect electrical connection including interconnected electrical filter means and phase shifting means, a high impedance load device connecting the output of said phase shifting means to the input of said filter means, the output of said high impedance load device connected to the input of said filter means and the output of said filter means connected across the dual path of said comparing network receiving the pure sine wave voltage, electromagnetic means coupling said phase shifting means to said generator means, means driving said generator means, voltage recording means connected for selective application of the voltages in each of said dual paths of said comparing network, said comparing network yielding a differential output between the simultaneously applied synchronous alternating and pure sine wave voltages connected across the dual paths of said comparing network, recording means electrically connected to the output of said comparing network and actuated in response to said differential output voltage whereby the deviation factor of said alternating voltage of periodic unknown wave form may be determined.

11. Apparatus as recited in claim 10 wherein each of the dual paths of said comparing network includes a potentiometer.

12. Apparatus as recited in claim 10 wherein said high impedance load comprises a thermionic amplifier having a high resistance load across the input thereof.

13. Apparatus as recited in claim 10 wherein said phase shifting means includes an electrical impedance network and a mechanical switching member, said electrical impedance network having resistive and capacitative components, a portion of said resistive component being variable.

14. A method for determining the deviation factor of a periodic unknown wave form including the steps of generating a periodic unknown alternating voltage wave form and a sine wave voltage of common frequency from separate sources, applying said alternating voltage across an impedance forming one path of a dual path comparing network, applying said sine wave voltage across an impedance in the other path of said dual path comparing network, electromechanically adjusting the phase of the sine wave voltage relative to said alternating voltage of periodic unknown wave form, measuring the voltage in each of said dual paths of said comparing network and adjusting the impedance values in each path of the comparing network until equal voltage readings are obtained, and simultaneously applying the output of the comparing network representing the differential voltage between the alternating and sine wave voltages as an equivalent sine wave voltage to a rectifying circuit and applying the output voltage of the rectifying circuit to a peak voltage recording device and determining the deviation factor of the periodic unknown wave form as a ratio relating the minimum value of the maximum difference between corresponding ordinates of the alternating and sine wave voltage wave forms recorded by the comparing network voltage readings to the maximum voltage of the equivalent sine wave recorded by the peak voltage recording device.

15. A method for determining the deviation factor of a periodic unknown wave form including the steps of applying a periodic unknown alternating voltage wave form across one impedance of a dual branch voltage comparing network successively through a filtering and phase shifting circuit to obtain a sine wave voltage having a common frequency with the alternating voltage, electromechanically adjusting the phase of the sine wave voltage to be coincident with the phase of the alternating voltage and simultaneously applying the alternating voltage directly across another impedance of the dual branch voltage comparing network, measuring the voltage in each of the dual branches of the voltage comparing network and adjusting the impedance values in each branch of the comparing network until equal voltage readings are obtained and simultaneously applying the differential output of the dual branches of the comparing network representing the difference in voltage between the alternating and sine wave voltages as an equivalent sine wave voltage to a rectifying circuit, applying the output voltage of the rectifying circuit to a peak reading voltage recording device and determining the deviation factor of the periodic unknown wave form as a ratio relating the minimum value of the maximum difference between corresponding ordinates of the alternating and sine wave voltage wave forms recorded by the comparing network voltage readings to the maximum voltage of the equivalent sine wave recorded by the peak voltage recording device.

16. A method for determining the deviation factor of a periodic unknown wave form including the steps of electromagnetically coupling a periodic alternating voltage of unknown wave form to an electrical filter network yielding a sine wave voltage of common frequency with the alternating voltage, applying the sine wave voltage to an electromechanical phase shifter and adjusting the latter to obtain an in-phase relation between the alternating voltage and the sine wave voltage, applying the sine wave voltage of the phase shifter across one impedance of a dual branch voltage comparing network and simultaneously applying the periodic alternating voltage of unknown wave form directly across another impedance of the dual branch voltage comparing network, measuring the voltage in each of the dual branches of the voltage comparing network and adjusting the impedance values in each branch of the comparing network until equal voltage readings are obtained, and simultaneously applying the differential output of the dual branches of the comparing network representing the difference in voltage between the alternating and sine wave voltages as an equivalent sine wave voltage to a rectifying circuit, applying the output voltage of the rectifying circuit to a peak reading voltage recording device and determining the deviation factor of the periodic unknown wave form as a ratio relating the minimum value of the maximum difference between corresponding ordinates of the alternating and sine wave voltage wave forms recorded by the comparing network voltage readings to the maximum voltage of the equivalent sine wave recorded by the peak voltage recording device.

17. A method for determining the deviation factor of a periodic unknown wave form including the steps of electromagnetically coupling a periodic unknown alternating voltage wave form to an electromechanical phase shifter and applying the output thereof to a high impedance load, electrically filtering the output of the high impedance load to obtain a sine wave voltage and applying the filtered output across one impedance of a dual branch voltage comparing network and simultaneously applying the periodic alternating voltage of unknown wave form directly across another impedance of the dual branch voltage comparing network, adjusting the electromechanical phase shifter to obtain an in-phase relation between the sine wave and alternating voltages, measuring the voltage in each of the dual branches of the voltage comparing network and adjusting the impedance values in each branch of the comparing network until equal voltage readings are obtained and simultaneously applying the differential output of the dual branches of the comparing network, representing the difference in voltage between the alternating and sine wave voltages, as an equivalent sine wave voltage to a rectifying circuit, applying the output voltage of the rectifying circuit to a peak reading voltage recording device and determining the deviation factor of the periodic unknown wave form as a ratio relating the minimum value of the maximum difference between corresponding ordinates of the alternating and sine wave forms recorded by the comparing network voltage readings to the maximum voltage of the equivalent sine wave recorded by the peak voltage recording device.

References Cited in the file of this patent
UNITED STATES PATENTS
2,785,377    MacFee _____ Mar. 12, 1957